United States Patent
Shi et al.

(10) Patent No.: US 9,690,473 B2
(45) Date of Patent: Jun. 27, 2017

(54) SYSTEM AND METHOD FOR CHANGING THE STATE OF USER INTERFACE ELEMENT MARKED ON PHYSICAL OBJECTS

(71) Applicants: Zheng Shi, Beijing (CN); Xingyi Gong, Beijing (CN)

(72) Inventors: Zheng Shi, Beijing (CN); Xingyi Gong, Beijing (CN)

(*) Notice: Subject to any disclaimer, the term of this patent is extended or adjusted under 35 U.S.C. 154(b) by 0 days.

(21) Appl. No.: 15/057,092

(22) Filed: Feb. 29, 2016

(65) Prior Publication Data
US 2016/0179333 A1 Jun. 23, 2016

Related U.S. Application Data

(63) Continuation-in-part of application No. PCT/CN2014/091918, filed on Nov. 21, 2014, which is a continuation-in-part of application No. PCT/CN2014/090890, filed on Nov. 12, 2014, which is a continuation-in-part of application No. PCT/CN2014/080495, filed on Jun. 23, 2014, which is a continuation-in-part of application No. PCT/CN2014/079892, filed on Jun. 13, 2014, said application No. PCT/CN2014/091918 is a continuation-in-part of application No. PCT/CN2014/086745, filed on Sep. 17, 2014, and a continuation-in-part of application No. PCT/CN2014/091143, filed on Nov. 14, 2014.

(51) Int. Cl.
*G06F 3/048* (2013.01)
*G06F 3/0488* (2013.01)
*G06F 3/044* (2006.01)

(52) U.S. Cl.
CPC ............ *G06F 3/0488* (2013.01); *G06F 3/044* (2013.01)

(58) Field of Classification Search
CPC .......... G06F 3/044; G06F 3/03; G06F 3/0416; G06F 3/017; G06F 3/0488; G06F 3/0425
See application file for complete search history.

(56) References Cited

U.S. PATENT DOCUMENTS

| | | | |
|---|---|---|---|
| 7,397,464 B1 | 7/2008 | Robbins et al. | |
| 8,485,450 B2 * | 7/2013 | Alden | G06F 3/0202 235/375 |

(Continued)

OTHER PUBLICATIONS

SIPO: International Search Report for PCT Application No. PCT/CN2014/091918 filed Nov. 21, 2014, dated Mar. 2, 2015.

*Primary Examiner* — Tadeese Hailu

(57) ABSTRACT

The present invention discloses a system and method for changing the state of a user interface (UI) element of a computer program visually marked on a physical object, through a touch action upon the object, among a plurality of objects on the interactive surface, each comprising a capacitance tab and a unique identification code. During runtime execution of the computer program, and in response to a touch action upon an object by an end-user, the interactive surface is configured to detect such touch action upon the object through an embedded capacitance sensor positioned under the object, and direct a sensory accessory to indicate a new state of the UI element marked on an object by exhibiting a new sensory pattern. The present invention offers enhanced interactivity between an end-user and a computer program mediated by physical objects.

19 Claims, 5 Drawing Sheets

(56) References Cited

U.S. PATENT DOCUMENTS

| | | | | |
|---|---|---|---|---|
| 8,584,029 | B1* | 11/2013 | Gerde | G06F 3/0488 |
| | | | | 715/771 |
| 2005/0275635 | A1 | 12/2005 | Dehlin et al. | |
| 2006/0112335 | A1* | 5/2006 | Hofmeister | G06F 3/0488 |
| | | | | 715/701 |
| 2007/0022369 | A1* | 1/2007 | Han | G06F 1/18 |
| | | | | 715/202 |
| 2007/0289784 | A1* | 12/2007 | Lapstun | G06F 3/03545 |
| | | | | 178/18.03 |
| 2008/0191864 | A1* | 8/2008 | Wolfson | G06F 3/011 |
| | | | | 340/524 |
| 2009/0143141 | A1* | 6/2009 | Wells | G07F 17/32 |
| | | | | 463/37 |
| 2009/0219253 | A1* | 9/2009 | Izadi | G06F 3/0421 |
| | | | | 345/173 |
| 2009/0273560 | A1* | 11/2009 | Kalanithi | G06F 3/002 |
| | | | | 345/156 |
| 2010/0026470 | A1* | 2/2010 | Wilson | G06F 3/046 |
| | | | | 340/10.52 |
| 2010/0026635 | A1* | 2/2010 | Dimitrov | G06F 3/0202 |
| | | | | 345/173 |
| 2010/0234094 | A1* | 9/2010 | Gagner | G07F 17/32 |
| | | | | 463/20 |
| 2013/0082933 | A1* | 4/2013 | Liang | G06F 1/1662 |
| | | | | 345/169 |
| 2013/0316817 | A1* | 11/2013 | Tanzawa | G06F 3/0488 |
| | | | | 463/31 |
| 2014/0282002 | A1* | 9/2014 | Mckiel, Jr. | G06F 3/167 |
| | | | | 715/727 |

* cited by examiner

SYSTEM AND METHOD FOR CHANGING THE STATE OF USER INTERFACE ELEMENT MARKED ON PHYSICAL OBJECTS

CROSS-REFERENCE TO RELATED APPLICATION

This application is a continuation in part of International Patent Application No. PCT/CN2014/091918, entitled "System and Method for Changing the State of User Interface Element Marked on Physical Objects", filed on Nov. 21, 2014, which is a continuation in part of International Patent Application No. PCT/CN2014/090890, entitled "System and Method for Recognizing Objects with Continuous Capacitance Sensing", filed on Nov. 12, 2014, which is a continuation in part of International Patent Application No. PCT/CN2014/080495, entitled "System and Method to Recognize an Object's ID, Orientation and Location Relative to an Interactive Surface", filed on Jun. 23, 2014, which is a continuation in part of International Patent Application No. PCT/CN2014/079892, entitled "System and Method for Identifying an Object's ID and Location Relative to an Interactive Surface", filed on Jun. 13, 2014.

The International Patent Application No. PCT/CN2014/091918 is also a continuation in part of International Patent Application No. PCT/CN2014/086745, entitled "System and Method for Directing a Small Scale Object to Generate a Sensory Output to a User Powered by RF Energy Harvesting", filed on Sep. 17, 2014.

The International Patent Application No. PCT/CN2014/091918 is also a continuation in part of International Patent Application No. PCT/CN2014/091143, entitled "System and Method to Interact with Elements of a Language Using Physical Objects", filed on Nov. 14, 2014.

The entire disclosures of each of the above applications are incorporated herein by reference.

TECHNICAL FIELD

The present invention relates to operation of a computer program by end-users using physical objects, by touching the physical objects to effect a change in the state of the user interface element marked on the physical objects.

BACKGROUND

Computer systems use a combination of screens and input devices such as keyboards and mouse devices in order for a user to operate computer programs. The GUI (Graphical User Interface) that uses the WIMP (window, icon, menu and pointing device) principle was invented at the Xerox Park Lab in the 1970s. This was to become the template by which all commercial computer systems would adhere to. Indeed, all commercial systems developed by Apple, Microsoft and Sun Microsystems to this day use some form of GUI system in order to allow users to naturally interact with computer programs.

However, depending on the application, it is at times desirable to allow for the interaction with a computer program to be made through the use of physical objects. This is particularly true for young children who have a natural affinity for physically manipulating objects. This also holds true whenever an open platform for group discussion and group play is used as the manipulation of physical objects naturally accommodates the interaction of several people using the same computer program. There is a clear contrast between the user experience derived from using physical objects and that of using the traditional screen-based method; a screen serves as a window of information whereas physical manipulation is a medium for personal use.

In order to enhance the experience of operating a computer program through manipulation of physical objects, there is a need to enable the "state" of a user interface element represented by a physical object to be managed. That is to say, the "state" should be visually presented to an end-user, and the "state" needs to change in response to the action by an end-user and according to logic of the computer program.

The use of physical objects placed on the surface of smart screens or electronic pads are known. A popular example of such would be Mattel's Apptivity toy series whereby players interact with a video game by moving a toy figurine across an iPAD surface. Although this product is visually impressive, actual interaction between the object and the software is limited to tracking the location and orientation of the object relative to the surface of the iPad. Thus, enhanced interactions between the player and the object such as allowing for touch-sensitivity of the object itself would therefore allow a whole new interactive dimension between the user and the software.

SUMMARY OF THE INVENTION

The present invention discloses a system and method to operate a computer program by an end-user, through the touch actions by the end-user upon a plurality of physical objects that have been placed on an interactive surface. More specifically, this present invention discloses a system and method to manage the state of a user interface (UI) element marked on an object, in order to offer enhanced interactivity between the end-user and the computer program and mediated by a plurality of physical objects.

In accordance with one embodiment of the present invention, the object can be a card, a button, a block, an icon, a sheet, or a figurine. The UI element can be start, stop, save, delete, okay, cancel, play, replay, record, complete, copy, duplicate, export, import, a letter of an alphabet, a word of a language, or an icon representing a musical symbol. And the state of a UI element can be active, non-active, in use, not in use, enabled, not enabled, selected, not-selected, not-executing, executing, completed, correct, incorrect, succeeded, or failed.

In accordance with one embodiment of the present invention, a physical object has been embedded within it a unique identification code (UID), in the form of an RFID tag, one or more capacitive sensor tags, and is visually marked with a UI element of a computer program. An interactive surface has been embedded with an array of RF antennas to read the UID of an object, an array of capacitive sensors of much higher density than the RF antenna array to allow a more precise detection of the location and orientation of an object that has been placed on the interactive surface.

In accordance with one embodiment of the present invention, one or more sensory accessories have been embedded either within the object or within the interactive surface. In both cases, the interactive surface controls the sensory pattern produced by the sensory accessory. By directing a sensory accessory to produce a sensory pattern, the interactive surface generates an indication of the state of the UI element marked on an object. The sensory accessory can be an LED light, an audio device, a video device, or a vibration generator device.

In accordance with one embodiment of the present invention, during runtime execution of the computer program, and in response to a touch action upon an object by an end-user, the interactive surface is configured to detect such touch action upon the object through an embedded capacitance sensor positioned under the object, and direct a sensory accessory to indicate a new state of the UI element marked on an object by exhibiting a new sensory pattern.

In accordance with one embodiment of the present invention, the touch action can be touching an object once, touching an object twice in rapid succession, touching an object once but for a duration of time, changing the orientation of an object with finger touch, or changing the location of an object with finger touch.

In accordance with one embodiment of the present invention, the system further includes a computer system that is operatively linked to the interactive surface and is configured to execute the computer program. The computer system stores the current state and a range of valid states of the UI element of the computer program marked on an object, and the relationship between a touch action and a change of the state of the UI element. And the interactive surface notifies the computer system of the touch action and receives an instruction according to the computer program regarding changing the current state of the UI element marked on an object.

DETAILED DESCRIPTION OF THE INVENTION

While the present invention will be described using specific embodiments, the invention is not limited to these embodiments. People skilled in the art will recognize that the system and method of the present invention may be used in many other applications. The present invention is intended to cover all alternatives, modifications and equivalents within the spirit and scope of invention, which is defined by the apprehended claims.

Furthermore, in the detailed description of the present invention, specific details are set forth in order to provide a thorough understanding of the present invention. However, it will be obvious to one of ordinary skill in the art that the present invention may be practiced without these specific details. In other instances, well known methods, procedures, components, and circuits are not described in details to avoid unnecessarily obscuring a clear understanding of the present invention.

The present invention will be better understood and its numerous objects and advantages will become apparent to those skilled in the art by reference to the accompanying drawings.

The embodiments of the present invention provide a system and method to operate a computer program by an end-user using a plurality of physical objects.

Figure 1:
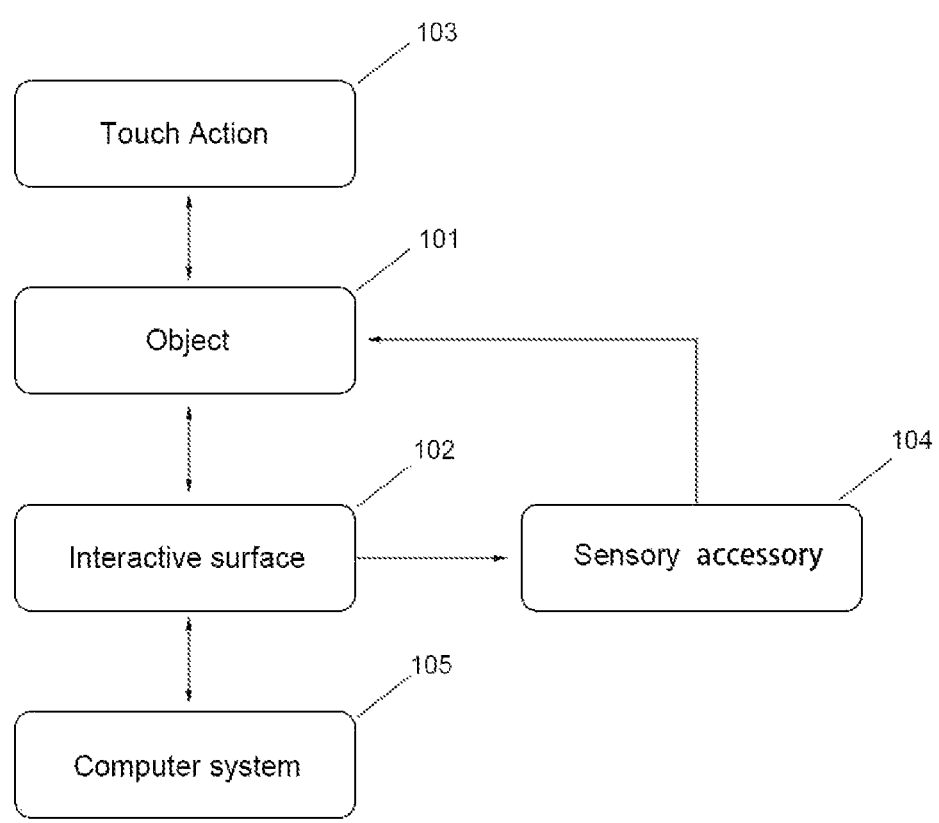
FIG. 1 is an exemplary schematic diagram illustrating the system process flow in accordance with one embodiment of the present invention.

FIG. 1 is an exemplary schematic diagram illustrating the system process flow in accordance with one embodiment of the present invention. As shown in FIG. 1, the system includes a plurality of physical objects 101, each comprising a unique identification code (UID) and visually marked with a UI element of a computer program. The UID can be encoded with a radio frequency identification chip (RFID), a pattern of capacitance tabs, or a pattern of magnetic tabs. The system also includes an interactive surface 102 that has no display screen and is configured to detect the UID of an object 101 and to derive the location and orientation of the object 101 once the object 101 is placed on it. The system further includes a sensory accessory 104 that is operatively controlled by the interactive surface 102 and indicates the current state of the UI element by exhibiting a sensory pattern. A computer system 105 is operatively linked to the interactive surface 102 and is configured to execute the computer program and direct the various electronic components of the interactive surface 102.

During runtime execution of the computer program, and in response to a touch action 103 by an end-user upon an object 101, the interactive surface 102 is configured to detect the touch action 103 and direct the sensory accessory 104 to indicate a new state of the UI element marked on the object 101 by exhibiting a new sensory pattern, and the computer system 105 is configured to incorporate such state change as an input in running the computer program. In details, the computer system 105 stores the current state and a range of valid states of the UI element marked on an object 101, and the relationship between the touch action 103 and a change of the state of the UI element marked on the object 101 according to the computer program.

The object can be a card, a button, a block, an icon, a sheet, or a figurine. The sensory accessory could be an LED light, an audio device, a video device, or a vibration generator device, and could provide end-users with physical feedback in the form of audio or visual effects.

The sensory accessory can be embedded within the interactive surface or within the object itself.

Figure 2:
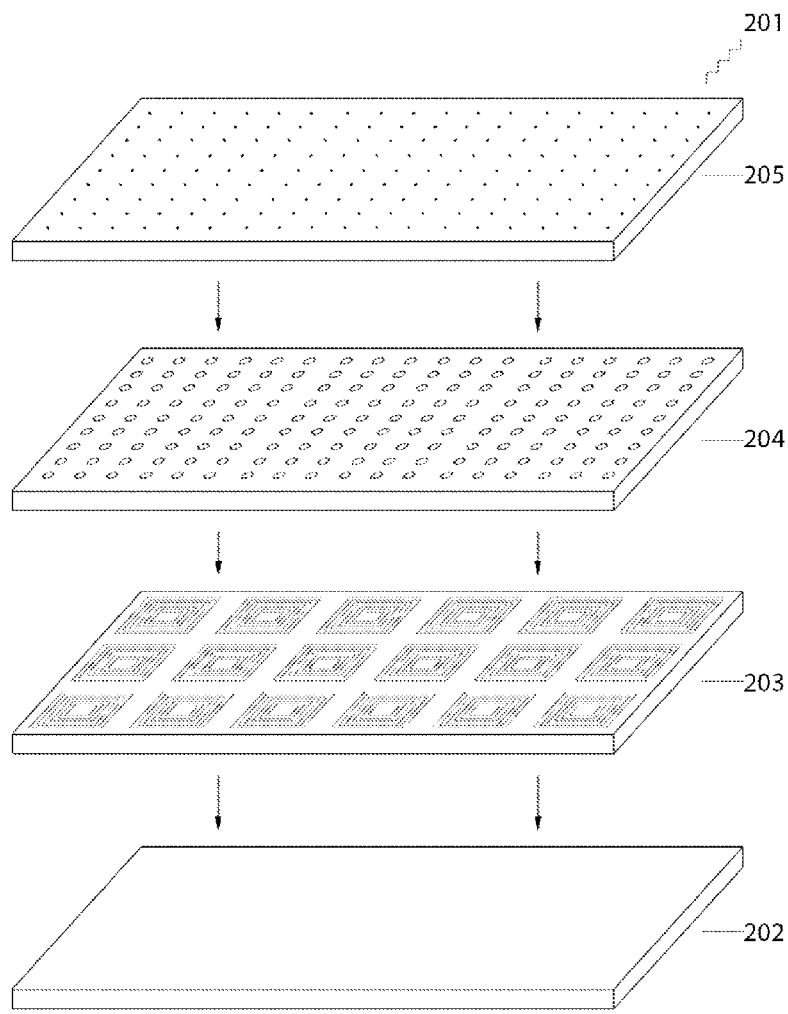
FIG. 2 is an exemplary schematic diagram of the interactive surface in accordance with an embodiment of the invention.

FIG. 2 is an exemplary schematic diagram of the system of the interactive surface 201 whereby each layer of the interactive surface 201 has been separated for illustration sake in accordance to one embodiment of the present invention. Within the confines of this embodiment, the interactive surface 201 can be separated into four layers. The bottom layer 202 is the substrate or base of the interactive surface 201. On top of the bottom layer is the second layer which consists of an array of RF antennas 203 whose purpose is to wirelessly communicate with the RFID tags of objects 101 in order for the computer system of the interactive surface 201 to determine the unique ID of the objects placed upon it. On top of the second layer is the third layer which consists of an array of capacitance sensors 204 whose purpose is to detect, through capacitive coupling with the object's structure made with material of high dielectric constant (i.e., capacitance tab), the location and orientation of objects placed upon the interactive surface 201 and transmit that information to the computer system. Finally, the top layer consists of an array of sensory accessories 205 such as LED lights whose purpose is to provide user feedback by, for example, lighting up the areas surrounding specifically relevant objects whenever instructed by the computer system.

Figure 3:
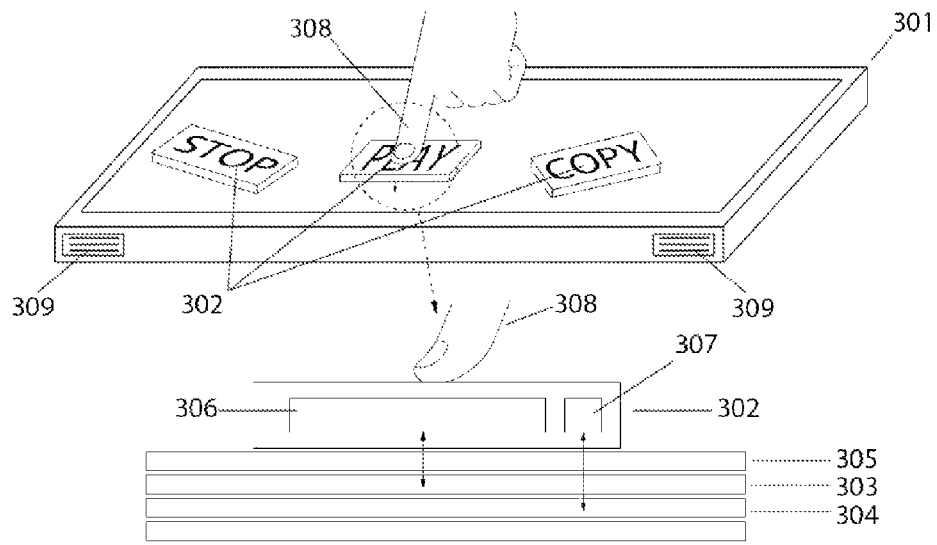
FIG. 3 is an exemplary schematic diagram of the interactive surface detecting a touch action in accordance with an embodiment of the invention.

FIG. 3 is an exemplary schematic diagram further illustrating the process of detection of a touch action by the interactive surface using the system design described in FIG. 2. In this embodiment, a plurality of cards 302, each visually marked with a UI element of a computer program, are placed on the interactive surface 301. The UI element in this particular embodiment can be: start, stop, save, delete, okay, cancel, play, replay, record, complete, copy, duplicate, export, import, a letter of an alphabet, a word of a language, and an icon representing a musical symbol, etc. Each of the cards 302 further has an identifier that contains the ID information of the card. The interactive surface 301 further includes an array of capacitance sensors 303 and an RF antenna array 304 that are capable of detecting the ID, location and orientation of the cards 302 placed upon it and operatively linked to a computer system.

The cards 302 are each embedded with a material of high dielectric constant (i.e., capacitance tab) 306 so as to allow for capacitive coupling between the card 302 and the interactive surface's 301 capacitance sensors located under the card 302. The design of this material of high dielectric constant 306 is made so as to allow for further capacitive coupling between an end-user finger touch 308 on the card 302 and the interactive surface's 301 capacitance sensors. The cards 302 are also each embedded with an RFID chip 307 so as to allows for the interactive surface's 301 computer system to read the UID of the card through wireless communication between the card's 302 RFID chip 307 and the RF antenna of the RF antenna array 304 that is located closest to the card 302.

Each time a card 302 is placed on the interactive surface 301, during runtime execution of a computer program, the interactive surface 301 is configured to detect the UID of the card 302 and derive the location and orientation of the card 302. Afterwards, a sensory accessory 305, 309 operatively controlled by the interactive surface 301 is directed by the computer system to indicate the current state of the UI element marked on the card 302. The state of a UI element can be: active, non-active, in use, not in use, enabled, not enabled, selected, not-selected, not-executing, executing, completed, correct, incorrect, succeeded, failed, etc. In the example illustrated on FIG. 3 the initial state of the UI elements marked on the three cards 302 placed on the interactive surface 301 are non-active or not enabled so none of the LED lights are lit up in this case.

In FIG. 3, the sensory accessories consist of an array of LED lights 305 embedded on the surface of the interactive surface 301 as well as a speaker system 309 also embedded in the interactive surface 301.

The method of the present invention can be described as flows. As each card 302 is embedded with a structure made with material of high dielectric constant 306 so that, after the card 302 is placed upon the interactive surface 301 and a change in capacitance has been detected and measured by the capacitance sensors of the interactive surface 301, a further change in capacitance is detected and measured by the capacitance sensors whenever a human finger 308 touches the card 302. A signal representing this change in capacitance is sent to and recorded by the computer system and determined to be caused by a touch action, which enables the computer program to interpret the touch action into a change of the current state of the UI element marked on the card 302. An instruction is then provided to the computer system according to the computer program regarding changing the current state of the UI element marked on the card 302 acted upon by the touch action, and for the computer system to direct those LED lights of the LED light array 305 located around the card 302 to light up to indicate the new state of the UI element marked on the card 302 acted upon by the touch action. The computer system also simultaneously directs the speaker system 309 to broadcast an audio recording in order to further indicate the new state of the UI element marked on the card 302 acted upon by the touch action. For example, the LED lights are lit up once the card "PLAY" is touched by the finger of an end-user. Besides touching a card 302 once, the touch action could also include touching a card 302 twice or more in rapid succession, touching the card 302 once but for a longer duration of time, changing the orientation of a card 302 with finger touch, or changing the location of a card 302 with finger touch.

Figure 4:
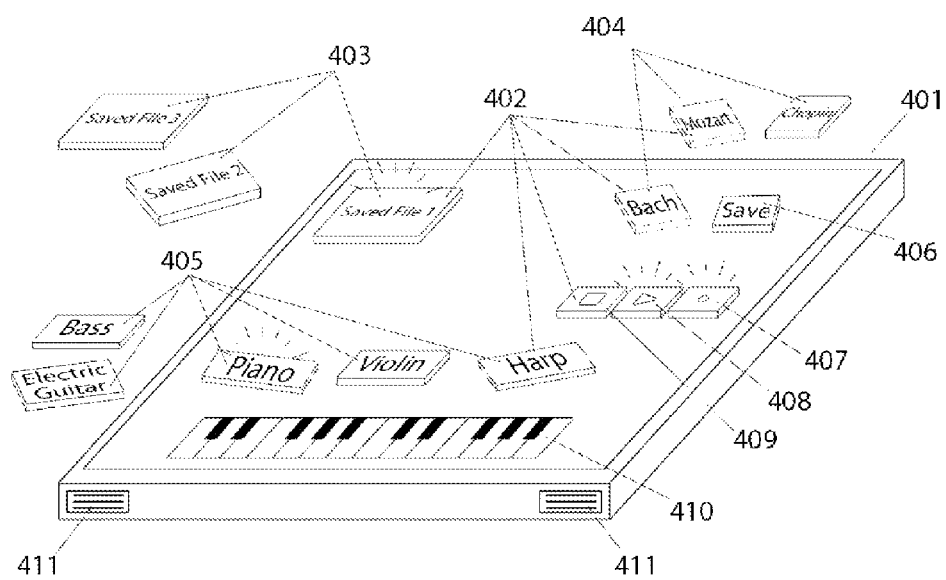
FIG. 4 is an exemplary schematic diagram illustrating the system for a music application in accordance with one embodiment of the present invention.

FIG. 4 is an exemplary schematic diagram illustrating the system for a music application in accordance with one embodiment of the present invention. As shown in FIG. 4, during runtime execution of the music application, a number of cards 402 are placed upon the interactive surface 401 initially causing the computer system of the interactive surface 401 to determine the location, orientation and UID of each of these cards 402 through the same process described previously in FIG. 3.

Each of the cards 402 is visually marked with a UI element of a music application. For example, the cards can be marked with the number of a music saved file 403, an accompanying melody 404, a musical instrument 405, or basic user functions such as save 406, record 407, play 408, and stop 409.

As an end-user places cards 402 upon the interactive surface 401, these automatically become part of the user interface of the music application.

Once the location, orientation and UID of each of these cards 402 has been determined, a sensory accessory is directed by the computer system to indicate the current state of the UI element marked on the card 402. In this embodiment, the computer system directs those LED lights of the LED light array located around the card 402 to either turn on or off in order to indicate the state of the UI element marked on the card 402. Referring to the cards 402 that have placed on the interactive surface 401, one can see that a number of cards 402 have their LEDs on indicating an "active" state whereas all other cards 402 are deemed "non-active". It will be noted that the LEDs of these "active" cards 402 could either be continuously on or flashing.

An end-user may start the music application by creating a piece of music himself by playing the electronic keyboard 410. Whenever the end-user wants to record this piece of music, they can press the "record" card 407 with their finger. As elaborated previously, a change in capacitance caused by the finger touch is then detected and measured by the capacitance sensors of the interactive surface 401 that are located underneath the "record" card 407 and a signal representing this change in capacitance is sent to and processed by the computer system. The computer system determines that this change in capacitance was caused by a touch action and the computer program interprets the touch action as a change of the current state of the UI element marked on the "record" card 407. Activating the "record" card 407 will cause the computer program to record the music being created by the end-user. An instruction is provided by computer system to the interactive surface 401 to direct the LED lights located around the card to light up or off so as to visually indicate to the end-user the new state of the UI element. Whenever the end-user wants to stop the recording of the music piece they are creating, they proceed by pressing the "stop" card 409. This "stop" action will lead the computer program to stop recording and the computer software to simultaneously light up the "stop" card 409 and switch off the "record" card 407.

As seen above, a range of valid states can exist for the UI element marked on a card, and the relationship between a touch action and a change of the state of the UI element is established and stored by the computer program.

Before being touched, the state of the UI element marked on the "record" card 407 is "non-active" or "not in use". With a single long touch by the end-user on the "record" card 407, the state of the UI element is changed to "active" or "in use", which triggers the execution of the computer program by recording the music.

Similarly, the state of the UI element marked on the "stop" card 409 is changed from "not enabled" to "enabled" with a single touch by the end-user. As a consequence of this touch action, the state of the UI element marked on the "record" card 407 is also changed back to "non-active" or "not in use".

Lastly, the UI element marked on the "play" card 408 is changed from "not-executing" to "executing" by a double touch in quick succession by the end-user, which triggers the music to be played by the computer system. As a consequence of this touch action, the state of the "stop" card 409 is changed back to "not enabled" from "enabled".

Whenever an end-user wants to save the music piece they have created, they proceed by placing a "save file" card 403 with a specific number assigned to it upon the interactive surface 401 and proceeds to save the music piece by pressing on the card for a determined amount of time (i.e., usually long enough for the interactive surface to confirm with the end-user through audio feedback broadcasted out via the speaker system 411).

Whenever the end-user wants to hear back a saved music piece they proceed by pressing twice in rapid succession on the specific "save file" card 403 which triggers the interactive surface 401 to begin broadcasting the audio file via the speaker system 411 as well as have the LEDs surrounding the specific "save file" card 403 to start blinking (thus, indicating to the end-user that the music being played is attributed to that "save file" card 403). It will be noted that the computer system will also direct the LED lights surrounding the "play" card 408 to light up so as to illustrate the change in "state" for that particular user interface as well (i.e., the music is currently being played).

There exists a multitude of potential design alternatives for the card elements belonging to the embodiment described above but, for the sake of simplicity, the present document will only describe some basic features.

An end-user can have the music piece they have created to be accompanied by a preset melody. For example, referring back to FIG. 4, the "accompanying melody" card 404 named "Bach" is placed on the interactive surface 401. The end-user can select the playing of this piece at anytime by activating this "accompanying melody" card 404 by pressing on it using their finger. Such an action will cause the computer system to broadcast via the speaker system 411 a piece of the melody which could either be played by itself or as a complement to a piece of music created by the end-user. As with the previously disclosed cases, visual feedback in the form of LED lights lighting on or off is used to indicate to the end-user the state of that particular "accompanying music" card 404 at any given time.

An end-user can add, subtract or change the type of musical instrument that is used throughout the broadcasting of music pieces by selecting or deselecting with their finger "musical instrument" cards 405. Referring back to FIG. 4, the surrounding LED lights of the "violin" card 405 is switched on indicating to the end-user that the music piece is being played using the acoustics of a violin.

Figure 5:
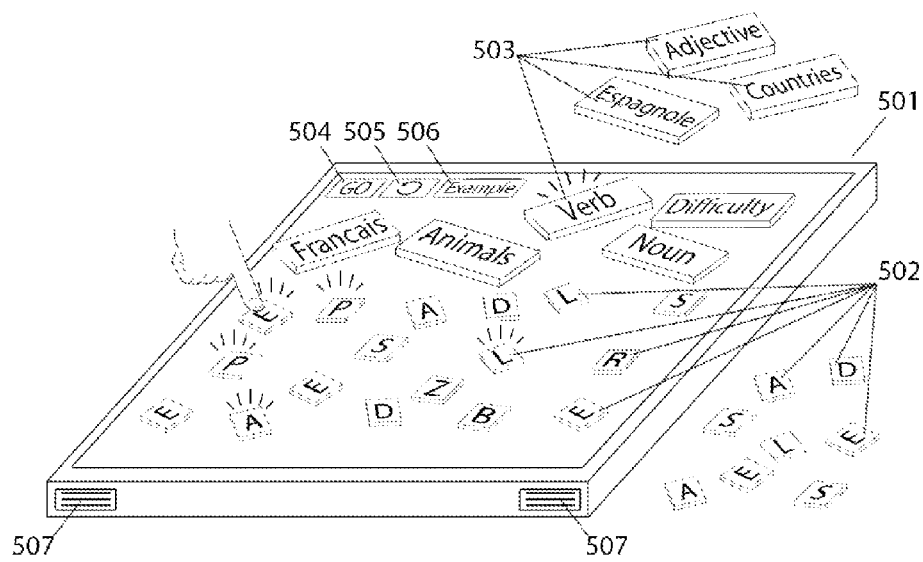
FIG. 5 is an exemplary schematic diagram illustrating the system for a word game in accordance with one embodiment of the present invention.

FIG. 5 is an exemplary schematic diagram illustrating the system for a word spelling game in accordance with one embodiment of the present invention.

The embodiment described in FIG. 5 is similar to that of the embodiment illustrated in FIG. 3 with a few notable differences. As previously the embodiment consists of an interactive surface 501 consisting of a base layer, a second layer comprising an RF antenna array and a third layer comprising an array of capacitance sensors. The interactive surface 501 further comprises a computer system which itself consists of a processor and a memory unit.

The cards 502 of the embodiment illustrated in FIG. 5 consist of cards 502 with capacitance tabs embedded into them so as to allow for capacitive coupling with the interactive surface's 501 capacitance sensors as well as an end-user's finger touch. Each card 502 further has an RFID containing the UID information of the card which can be wirelessly transmitted to the interactive surface's 501 computer system when directed to do so by one of the interactive surface's RF antenna.

Unlike the interactive surface described in FIG. 3, the interactive surface 501 here does not have a fourth layer comprising an array of LED lights. Instead, each card is embedded with one or more LED lights and the accompanying components that allow for the LED light(s) to be powered on and directed by the RF antenna of the interactive surface 501 through RF to DC energy conversion technology.

One embodiment for a language spelling game for the abovementioned system is the following. Each card has an identifier imprinted upon its surface wherein the identifier is either a letter of the alphabet 502 or a general user interface command 503 (e.g., "Difficulty", "Verb", "Animals", "French"). Furthermore, the computer system of the interactive surface's 501 has access to a database (located locally or remotely) whereby each of the cards' UID match the identifier imprinted upon the surface of the cards and is related to a particular "state" or function of the electronic program that can be altered by physically pressing on the card 502.

An end-user begins a game by placing a number of cards 502 with letters of the alphabet imprinted upon the interactive surface 501, as illustrated in FIG. 5. This leads to the automatic detection and recognition of the location and UID of each card 502 by the interactive surface by the same process described in the previous embodiments. The end-user then initiates the language spelling game by pressing on the "Go" button 504. This causes the computer program of the computer system to broadcast an audio recording via the speakers 507 prompting the end-user to correctly spell out a word based on the letters of the alphabet in play (i.e. cards 502 already placed upon the interactive surface 501). The end-user can then proceed to respond to the challenge by selecting through a finger touch, in the correct sequence, the cards 502 whose letters correspond to the spelling of the word that has been broadcasted to the end-user. By pressing on a card 502, the end-user is effectively changing the state of the card's user interface function. There are two potential outcomes from selecting a non-activated letter card 502 during the course of a word spelling challenge. The first is for the state of the selected card 502 to change from "non-active" to "active and correct" and the second is for the state of the card to change from "non-active" to "active and incorrect". Depending on whether the end-user selection was correct or not will yield different feedback to the end-user.

Each time the end-user presses upon the surface of a card 502, and depending on whether the selection was correct, the computer system directs the RF antenna located closest to that card to light up the card 502 in question through RF to DC energy conversion technology.

The end-user may also choose to replay the audio broadcast of the word to spell by pressing on the "replay" button 505 or they can also press the "example" button 506 to hear the word in the context of a sentence.

Referring back to FIG. 5, one can see a specific example of the game design described above. In this case, the end-user was challenged to spell correctly the word "Apple" and they have proceeded to correctly press in the cards whose letters spell out the word "Apple". More specifically, as the end-user selected all 5 cards, the state of each of these is changed from "non-active" to "active and correct". This has caused the LED lights of each card 502 to light up in order to indicate the correct selection by the end-user. In a preferred embodiment, a correct or incorrect selection is also followed by an indicative sound broadcasted by the speakers 507 of the interactive surface 501. The use of more than one LED lights of different colors per cards 502 in order to differentiate a correct of incorrect selection is another alternative feedback design.

The end-user can choose to alter the language spelling game by placing general user interface command cards 503 upon the interface surface and proceed by touching them. Thus, the end-user may choose to alter the level of spelling difficulty by pressing once on the "Difficulty" card 503 to cause the computer program to go into an easy mode (thus challenging the player to spell out relatively easy words). The end-user may instead choose intermediate or difficult modes by tapping on the same card 503 twice or thrice respectively in rapid succession. In effect this card 503 will change from three different states (i.e. easy, intermediate and difficult) by the type of touch the end-user has with it.

The end-user may also choose to change the form of the word the computer program will challenge them with by picking any of the general user interface command cards 503 that correspond to this description and change their relative state by pressing on them. Referring to FIG. 5, one can see that in that particular scenario, two cards 503 with the words "Verb" and "Noun" have been placed upon the interactive surface 501 but only the card "Verb" 503 is in an active state as its LED light is activated. This indicates the end-user that all words that the computer program will challenge them at that time with will be verbs.

The end-user may also choose to select words that correspond to a certain category of elements. For example, referring back to FIG. 5, one can see that the general user interface card 503 with "animal" has been placed upon the interactive surface 501 (it will be noted that an alternative design will be to have the image of an animal on the card instead of the actual word "animal"). If the end-user presses on that card, leading to its activation (e.g. changing its state) and the lighting up of its LED light, the computer program will then proceed to challenge the end-user with the spelling of words comprising of animal names (e.g. the word "Zebra" is a possibility in the scenario depicted in FIG. 5).

Finally, the end-user may select the language that the game will proceed in by placing and touching the general user interface command cards 503 with the language name imprinted upon the card 503. Referring to FIG. 5, if the end-user presses on the card 503 "Francais", then the word challenges will be made in French.

This game design described above can be used in a form of language spelling "free form" game whereby the end-user randomly picks and places cards with letters printed upon them upon the interactive surface 501. This free form language spelling game design is particularly well suited for young children that have just started or are about to start learning spelling at its teaches them how to match certain letters or words with their corresponding sounds in a free and unrestrictive manner.

Figure 6:
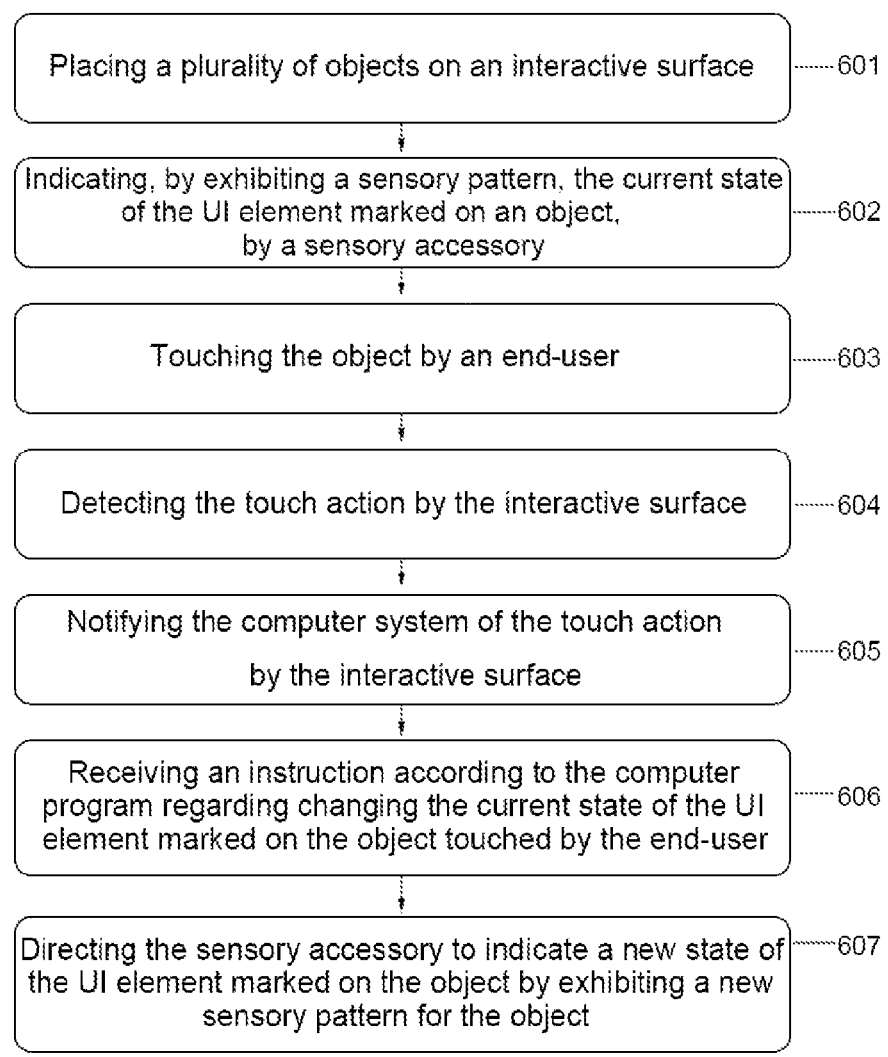
FIG. 6 is an exemplary schematic diagram illustrating the method process flow in accordance with one embodiment of the present invention.

FIG. 6 is an exemplary schematic diagram illustrating the method process flow in accordance with one embodiment of the present invention. As shown in FIG. 6, the system process includes the following steps.

Step 601: placing a plurality of objects on an interactive surface;

Step 602: indicating, by exhibiting a sensory pattern, the current state of the UI element marked on an object, by a sensory accessory;

Step 603: acting upon the object by a touch action;

Step 604: detecting a touch action by the interactive surface;

Step 605: notifying the computer system of the touch action by the interactive surface;

Step 606: receiving an instruction according to the computer program regarding changing the current state of the UI element marked on the object acted upon by the touch action;

Step 607: directing, by the interactive surface, the sensory accessory to indicate a new state of the UI element marked on the object by exhibiting a new sensory pattern for the object.

The invention claimed is:

1. A system for changing the state of a user interface (UI) element visually marked on physical objects, comprising:
    a plurality of physical objects, each comprising a unique identification code (UID) and each visually marked with a UI element of a computer program;
    an interactive surface that has no display screen, and is configured to detect the UID of an object, to derive the location and orientation of the object, and to measure capacitance change caused by the object and subsequently by a touch action upon the object, upon the object being placed on the interactive surface;
    a sensory accessory that is operatively controlled by the interactive surface, and indicates the current state of the UI element by exhibiting a sensory pattern;
    wherein, during runtime execution of the computer program, and in response to a touch action upon a first object, the interactive surface is configured to detect the touch action and direct the sensory accessory to indicate a new state of the UI element of a second object that is different from the first object by exhibiting a new sensory pattern for the second object.

2. The system of claim 1, wherein the UI element is selected from a group comprising start, stop, save, delete, okay, cancel, play, replay, record, complete, copy, duplicate, export, import, a letter of an alphabet, a word of a language, and an icon representing a musical symbol.

3. The system of claim 1, wherein the state of a UI element is selected from a group comprising active, non-active, in use, not in use, enabled, not enabled, selected, not-selected, not-executing, executing, completed, correct, incorrect, succeeded, and failed.

4. The system of claim 1, wherein the touch action is selected from a group comprising touching an object once, touching an object more than once in rapid succession, touching an object once but for a duration of time, changing the orientation of an object with finger touch, and changing the location of an object with finger touch.

5. The system of claim 1, further comprising a computer system that is operatively linked to the interactive surface and is configured to execute the computer program.

6. The system of claim 5, wherein the computer system stores the current state and a range of valid states of the UI element of the computer program marked on an object, and the relationship between a touch action and a change of the state of the UI element.

7. The system of claim 5, wherein the interactive surface notifies the computer system of the touch action and receives an instruction according to the computer program regarding changing the current state of the UI element marked on an object.

8. The system of claim 1, wherein an object is selected from a group comprising a card, a button, a block, an icon, a sheet, and a figurine.

9. The system of claim 1, wherein the sensory accessory is selected from a group comprising an LED light, an audio device, a video device, and a vibration generator device.

10. A method for changing the state of a user interface (UI) element visually marked on physical objects, comprising:

placing, during runtime execution of a computer program, a plurality of objects on an interactive surface, wherein each object comprises a unique identification code (UID) and is visually marked with a UI element of the computer program, and wherein the interactive surface has no display screen, and is configured to detect the UID of the object, derive the location and orientation of the object, and measure capacitance change caused by the object and subsequently by a touch action acted upon the object, upon the object being placed on the interactive surface, indicating, by exhibiting a sensory pattern, the current state of the UI element marked on a first object, by a sensory accessory that is operatively controlled by the interactive surface, acting upon the first object by a touch action, detecting the touch action by the interactive surface, directing, by the interactive surface, the sensory accessory to indicate a new state of the UI element marked on a second object that is different from the first object by exhibiting a new sensory pattern for the second object.

11. The method of claim 10, wherein the UI element is selected from a group comprising start, stop, save, delete, okay, cancel, play, replay, record, complete, copy, duplicate, export, import, a letter of an alphabet, a word of a language, and an icon representing a musical symbol.

12. The method of claim 10, wherein the state of a UI element is selected from a group comprising active, non-active, in use, not in use, enabled, not enabled, selected, not-selected, not-executing, executing, completed, correct, incorrect, succeeded, failed.

13. The method of claim 10, wherein the touch action is selected from a group comprising touching an object once, touching an object more than once in rapid succession, touching an object once but for a short duration of time, changing the orientation of an object with finger touch, and changing the location of an object with finger touch.

14. The method of claim 10, further comprising executing the computer program by a computer system that is operatively linked to the interactive surface.

15. The method of claim 14, further comprising, storing the current state and a range of valid states of the UI element of the computer program marked on an object, and the relationship between a touch action and a change in the state of the UI element, by the computer system.

16. The method of claim 14, further comprising notifying the computer system of the touch action by the interactive surface and receiving an instruction according to the computer program regarding changing the current state of the UI element marked on an object.

17. The method of claim 10, wherein an object is selected from a group comprising a card, a button, a block, an icon, a sheet, and a figurine.

18. The method of claim 10, wherein the sensory accessory is selected from a group comprising an LED light, an audio device, a video device, and a vibration generator device.

19. A system for changing the state of a user interface (UI) element visually marked on physical objects, comprising:

a plurality of physical objects, each comprising a unique identification code (UID) and each visually marked with a UI element of a computer program;

an interactive surface that has no display screen, and is configured to detect the UID of an object, to derive the location and orientation of the object, and to measure capacitance change caused by the object and subsequently by a touch action upon the object, upon the object being placed on the interactive surface;

a sensory accessory that is operatively controlled by the interactive surface, and indicates the current state of the UI element by exhibiting a sensory pattern;

wherein, during runtime execution of the computer program, and in response to a touch action upon an object, with the touch action selected from a group consisting of touching an object more than once in rapid succession, touching an object once but for a duration of time, changing the orientation of an object with finger touch, and changing the location of an object with finger touch, the interactive surface is configured to detect the touch action and direct the sensory accessory to indicate a new state of the UI element of the object by exhibiting a new sensory pattern for the object.

\* \* \* \* \*